United States Patent [19]

Koshimo et al.

[11] Patent Number: 4,573,374
[45] Date of Patent: Mar. 4, 1986

[54] VIBRATION DAMPER ASSEMBLY

[75] Inventors: Masahiko Koshimo, Higashi-osaka; Kiyoharu Murakami, Neyagawa, both of Japan

[73] Assignee: Kabushiki Kaisha Daikin Seisakusho, Osaka, Japan

[21] Appl. No.: 622,517

[22] Filed: Jun. 20, 1984

[30] Foreign Application Priority Data

Jun. 23, 1983 [JP] Japan .................. 58-114076

[51] Int. Cl.⁴ .................. F16F 15/10; F16D 47/02
[52] U.S. Cl. .................. 74/574; 464/68; 192/106.2
[58] Field of Search .................. 74/574, 781 R, 784; 464/65, 66, 68, 81; 192/106.2, 106.1

[56] References Cited

U.S. PATENT DOCUMENTS 1,636,706  7/1927  Reisfeld .................. 464/65
3,138,039  6/1964  Zeidler et al. .................. 74/574
3,695,405  10/1972  Maucher et al. .................. 464/68
4,101,015  7/1978  Radke .................. 192/106.2

FOREIGN PATENT DOCUMENTS 109745  6/1983  Japan .................. 74/574
5324    3/1904  United Kingdom .................. 74/574

Primary Examiner—Kenneth J. Dorner
Attorney, Agent, or Firm—Armstrong, Nikaido, Marmelstein & Kubovcik

[57] ABSTRACT

A vibration damper assembly, in which side plates are fitted onto an outer peripherary of a hub freely rotatably, a sun gear is formed on an outer peripheral surface of the hub, a flange plate is disposed outwardly from the sun gear with a space left therebetween, a ring gear facing at the sun gear is formed on an inner peripheral surface of the flange plate, a planetary gear supported by the side plates is made mesh between the sun gear and the ring gear, and the side plates and the flange plate are elastically interconnected through a torsion spring.

3 Claims, 3 Drawing Figures

VIBRATION DAMPER ASSEMBLY

FIELD OF THE INVENTION

This invention relates to a vibration damper assembly suitable for a clutch disc or a coupling etc. for use in a vehicle.

DESCRIPTION OF THE PRIOR ART

In a conventional vibration damper assembly, square holes are cut in a hub flange integrally formed with a central hub and side plates fitting onto the hub respectively, and a torsion spring is compressively installed in the square holes. In this composition, however, a size of the square hole is limitted so that it is impossible to take a trosion angle large.

Other methods have been proposed in order to obtain a larger torsion angle, such as those in which the hub has been divided into two pieces, a number of sheet of the side plate has been increased, and torsion springs have been disposed within one square hole in series etc. In these composition, however, there have been disadvantages not only of complicated mechanism but also of a heavy weight or an insufficient torsion angle to meet recent demands.

SUMMARY OF THE INVENTION

In consideration of the above disadvantages, an object of this invention is to provide a vibration damper assembly having a simple mechanism and a light weight yet allowing a large torsion angle which has never been obtainable, by employing a planetary gear mechanism.

In order to accomplish the above object, in this invention, side plates are fitted onto an outer periphery of a hub freely rotatably, a sun gear is formed on an outer peripheral surface of the hub, a flange plate is disposed outwardly from the sun gear with a space left therebetween, a ring gear facing at the sun gear is formed on an inner peripheral surface of the flange plate, a planetary gear supported by the side plates is made mesh between the sun gear and the ring gear, and the side plates and the flange plate are elastically interconnected through a trosion spring.

DETAILED DESCRIPTION OF THE INVENTION

Figure 1:
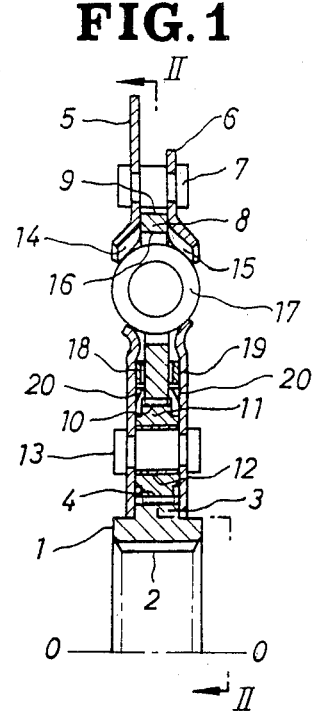
FIG. 1 is a vertical sectional partial view of a vibration damper assembly according to this invention.

In FIG. 1, a central cylindrical hub 1 locating its center axis on a center line 0—0 has on its inner periphery side a spline 2 fitting onto an output shaft (may be also an input shaft) not shown in the figure, a flange 3 projecting slightly outwardly is formed at an outer peripheral central part of the hub 1 integrally therewith, and a sun gear 4 stretching over the entire circumference is formed on an outer pheripheral surface of the flange 3. Further, two annular side plates 5, 6 sandwiching the flange 3 fit onto an outer peripheral surface of the hub 1 freely rotatably. The side plates 5, 6 are arranged in parallel each other and interconnected integrally by means of a stop pin 7 provided at an outer peripheral portion thereof. An annular flange plate 8 is disposed concentrically with the gear 4 at an outward thereof with an annular space left therebetween, and a notch 9 formed at an outer peripheral portion of the flange plate 8 fits with the stop pin 7. A ring gear 10 concentric with the sun gear 4 is formed on an inner peripheral surface of the flange plate 8, and a planetary gear 11 meshes with the sun gear 4 and the ring gear 10. The planetary gear 11 is supported by a supporting shaft 13 through a bush 12 freely rotatably, and the supporting shaft 13 is supported by the both side plates 5, 6 in parallel with the center line 0—0. Square holes 14, 15, 16 are provided on the side plates 5, 6 and the flange plate 8 in their corresponding positions respectively, and a coil spring 17 (torsion spring) extending in the circumferential direction is compressively installed in the square holes 14, 15, 16. Annular hysteresis torque generating mechanisms 18, 19 (for ex. a wave spring, a friction spring etc.) are interposed under a compressedly contacted condition between the both side plates 5, 6 and the flange plate 8 at an inner peripheral side of the torsion spring 17, and projections 20 projecting to the side of the flange plate 8 are integrally formed on the both side plates 5, 6 to support the mechanisms 18, 19 concentrically each other.

Figure 2:
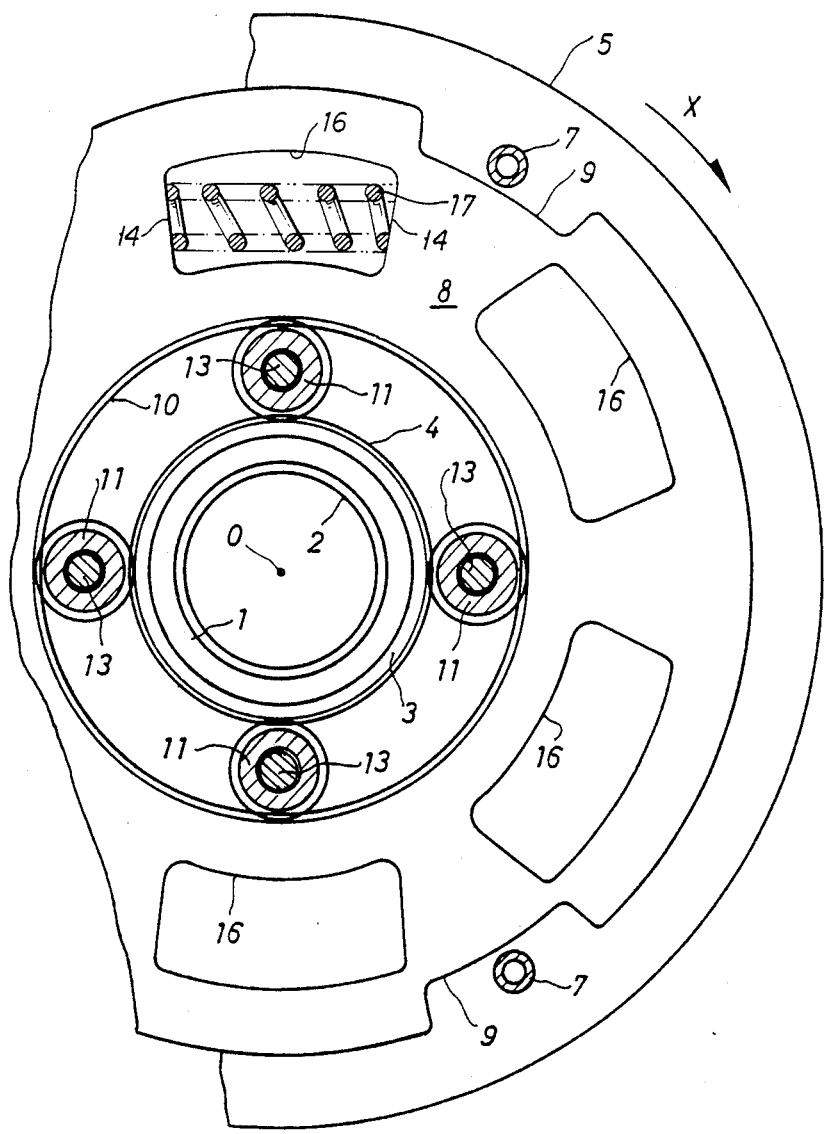
FIG. 2 is a sectional partial view taken on the line II—II of FIG. 1

Incidentally, in case for example when this damper is employed in a clutch disc, a cushioning plate (not shown) fixing annular facings on both surfaces is secured to an outer periphery of one side plate. Further, as shown in FIG. 2, the stop pin 7 is installed at three places spaced equally in the circumferential direction to fit with the notch 9 provided at three places spaced equally in the circumferential direction with plays left therebetween in the same direction. The square hole 16 is one having an approximately rectangular form and provided at six places spaced equally in the circumferential direction, and a spring 17 is compressively installed between both circumferential end faces of each hole 16 (partially omitted). The other square holes 14, 15 not shown in FIG. 2 are also provided at six places corresponding to the square holes 16 under a free condition, and both ends of the spring 17 compressedly contact with both circumferential end faces thereof. The planetary gear 11 is installed at four places spaced equally. Further, the supporting shaft 13 interconnects the both side plates 5, 6 (FIG. 1) integrally in parallel each other to also function as a means maintaining a distance between the both plates 5, 6 at a prescribed value correctly.

Function of the damper assembly will be described hereunder. It is supposed for example that the side plate 5 is interconnected to the side of engine (input side) and an output is taken out of an output shaft fitting in the hub 1 (naturally, the input and output sides can be reversed). When a torque having the direction X of FIG. 2 is applied on the side plate 5, the torque will be transmitted from the plate 5 through the supporting shaft 13 and the planetary gear 11 to the hub 1.

Here, if a torsional torque having the direction of X is applied on the side plate 5 (6) relatively to the hub 1, the plate 5 will rotate relatively to the hub 1 in the direction of X, and the planetary gear 11 will move in the direction of X while rotating on the sun gear 4. The rotation of the gear 11 will also generate a torque in the direction of X on the flange plate 8, and a larger angular velocity will arise in the flange plate 8 as compared with a torsional angular velocity of the plate 5 because the gear 11 is interposed therebetween, which will also produce a relative torsion between the side plate 5 (6) and the flange plate 8. Therefore, the spring 17 will be compressed and at the same time friction will arise in the hysteresis torque generating mechanisms 18, 19 to generate a hysteresis torque. A load in the direction opposite to $X_1$ is applied on the flange plate 8 due to a resiliency of the spring 17 to limit the rotation of the planetary gear 11, so that a torque having the direction of X is transmitted through the planetary gear 11 and the sun gear 4 to the hub 1.

Namely, a torsion between the side plate 5 (6) and the flange plate 8 becomes smaller than that between the side plate 5 (6) and the hub 1 to cause only a slight compression of the spring 17. For this reason, the torsion between the side plate 5 (6) and the hub 1 will increase by a large margin until the spring 17 is compressed to its maximum limit (where the stop pin 7 contacts with the end face of the notch 9), thus it becomes possible to obtain a large maximum torsion angle.

A maximum torsion angle (at the time when the stop pin 7 contacts with the end face of the notch 9) is designated as $\theta_1$ for a conventional damper assembly wherein the flange plate 8 is formed integrally with the hub 1 without providing the planetary gear 11, and a torsion torque corresponding thereto is designated at $T_{s1}$. While, a maximum torsion angle is designated at $\theta_2$ for the damper assembly according to the present invention, and a torsion torque corresponding thereto is designated at $T_{s2}$. A tooth number of the sun gear 4 and that of the ring gear 10 are designated as $Z_o$, $Z_i$ respectively, thus the following relational equations are obtainable.

$$r = Z_i/Z_o$$

$$T_{s1}/T_{s2} = \theta_2/\theta_1 = r$$

Figure 3:
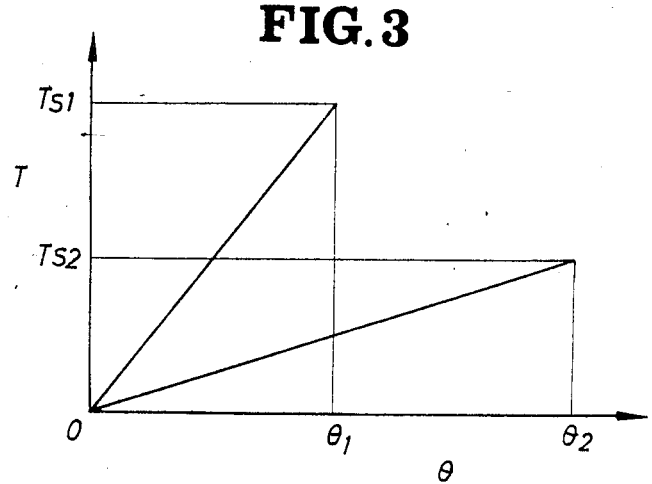
FIG. 3 is a graph showing torsion-angle/torsion-torque characteristics.

Torsion angle $\theta$/torsion torque T characteristics for the above cases will be graphed as shown in FIG. 3 (hysteresis torque curves are neglected).

Incidentally, in case when the torsion is released, the damper assembly will function in the reverse order as described above, thus torsional torque vibrations will be absorbed owing to friction in the mechanisms 18, 19. Further, in case when the plates 5, 6 are twisted in the reverse direction, the gear 11 is rotated to move in the direction opposite to X and the spring 17 is compressed, thus the torsional torque vibrations will be absorbed in the same manner as above.

As described above, in this invention, the side plates 5, 6 are fitted onto the outer periphery of the hub 1 freely rotatably, the sun gear 4 is formed on the outer peripheral surface of the hub 1, the flange plate 8 is disposed outwardly from the sun gear 4 with a space left therebetween, the ring gear 10 facing at the sun gear 4 is formed on the inner peripheral surface of the flange plate 8, the planetary gear 11 supported by the side plates 5, 6 is made mesh between the sun gear 4 and the ring gear 10, and the side plates 5, 6 and the flange plate 8 are elastically interconnected through a torsion spring (for example, the coil spring 17); so that a large torsion angle, which has never been expected in a conventional mechanism, becomes obtainable. Further, the maximum torsion angle can be changed easily by changing the tooth number ratio of the sun gear 4 to the planetary gear 11 ($r = Z_i/Z_o$) at discretion, so that no large square hole is required and the disadvantage of a decrease in strength having been encountered in conventional mechanisms can be dissolved. Moreover, the construction of this invention deviced for obtaining a large torsion angle is more simple and lightweight as compared with those of conventional ones.

Incidentally, this invention may also be embodied as follows:
  (a) The planetary gear 11 may be made of resin material such as engineering plastics having a high mechanical strength. In this case, a weight of the damper assembly will be further decreased.
  (b) The hysteresis torque generating mechanism may be interposed between the flange 3 and the side plates 5, 6.
  (c) A part of circumferential length of the square holes 14, 15 is made shorter than that of the square hole, so that the spring 17 will contact only with the square holes 14, 15 under a free state of the damper assembly. Then, a damper assembly will be obtained, in which the torque T will vary in multi-steps in relation to the torsion angle $\theta$.
  (d) A part or all of the coil spring 17 may be made of a rubber-like elastic body in place of it.

What is claimed is:

1. A vibration damper assembly including side plates fitted onto an outer periphery of a hub freely rotatably, a sun gear formed on an outer peripheral surface of the hub, a flange plate disposed outwardly from the sun gear with a space left therebetween, a ring gear facing at the sun gear being formed on an inner peripheral surface of the flange plate, and a planetary gear supported by the side plates being made mesh between the sun gear and the ring gear, the side plates and the flange plate being elastically interconnected through a torsion spring.

2. A vibration damper assembly as set forth in claim 1, in which said torsion spring is compressively installed in square holes provided in the side plates and the flange plate in an approximately circumferential direction.

3. A vibration damper assembly as set forth in claim 2, in which a part of circumferential length of the square holes in the side plates is made shorter than that of the square hole in the flange plate, so that the torsion spring will contact only with said part of square holes under a free state of the damper assembly to allow its torsion torque change in multi-steps.

* * * * *